US006616340B2

(12) United States Patent
Hacker

(10) Patent No.: US 6,616,340 B2
(45) Date of Patent: Sep. 9, 2003

(54) HUB ASSEMBLY WITH DRIVEN HUB

(75) Inventor: Robert W. Hacker, Canton, OH (US)

(73) Assignee: The Timken Company, Canton, OH (US)

(*) Notice: Subject to any disclaimer, the term of this patent is extended or adjusted under 35 U.S.C. 154(b) by 0 days.

(21) Appl. No.: 09/996,296

(22) Filed: Nov. 28, 2001

(65) Prior Publication Data
US 2003/0098563 A1 May 29, 2003

(51) Int. Cl.$^7$ ................................................. F16C 33/36
(52) U.S. Cl. ........................ 384/589; 384/564; 384/571; 464/178
(58) Field of Search ................................. 384/589, 571, 384/564; 464/178

(56) References Cited

U.S. PATENT DOCUMENTS

| | | | |
|---|---|---|---|
| 3,397,020 A | | 8/1968 | Edwards |
| 3,578,831 A | * | 5/1971 | Scheifele ................... 384/571 |
| 4,136,916 A | | 1/1979 | Musselman et al. |
| 4,333,695 A | * | 6/1982 | Evans ......................... 384/562 |
| 5,037,214 A | * | 8/1991 | Dougherty ................... 384/571 |
| 5,494,358 A | * | 2/1996 | Dougherty ................... 384/448 |
| 5,536,098 A | * | 7/1996 | Schwarzler ................. 384/544 |

FOREIGN PATENT DOCUMENTS

| | | |
|---|---|---|
| JP | 2000179546 A | 6/2000 |
| WO | 0181152 | 11/2001 |

* cited by examiner

Primary Examiner—Thomas R. Hannon
(74) Attorney, Agent, or Firm—Polster, Lieder, Woodruff & Lucchesi, L.C.

(57) ABSTRACT

A vehicle wheel hub with a flange by which a wheel is mounted, the hub being supported by a knuckle and rotated through a universal joint, such as a CV joint, the CV joint having an outer joint member or shell with a cylindrical end having an end face. Axially spaced inboard and outboard tapered roller bearing members are positioned between the hub and the knuckle. The inboard bearing member has a cone with a raceway and a back face but no thrust rib. The shell cylindrical end face abuts the inboard cone back face and is adapted to engage the back faces of tapered rollers of the inboard roller bearing member to serve as a thrust rib for the inboard bearing member.

6 Claims, 1 Drawing Sheet

HUB ASSEMBLY WITH DRIVEN HUB

CROSS REFERENCE TO RELATED APPLICATIONS

STATEMENT REGARDING FEDERALLY SPONSORED RESEARCH OR DEVELOPMENT

Not Applicable

BACKGROUND OF THE INVENTION

Automotive vehicle wheels are typically supported on two rows of rolling elements with opposing angular contact to oppose the moments placed on them in cornering. The wheel is typically attached to a hub on which bearing inner races (cones) are located. A suspension component, attached to control arms, springs, and, in the case of front wheel drive, a steering linkage, typically called a knuckle, is a support for the bearing and wheel. The bearing outer races (cups) are mounted to or within the knuckle. A universal joint, usually in the form of a constant velocity joint (CVJ), transmits torque from a drive shaft to the wheel hub. The bearing is trapped between the wheel hub and the universal joint, in the illustrative embodiment shown and described, a CVJ. When tapered roller bearings are used, the rollers are typically guided by thrust ribs on the cones of the bearings. Each cone at the end of its thrust rib has a back face, and the back face on the inboard cone is abutted with a face on the CVJ. The rib face which guides the rollers is a substantial distance axially from the back face abutting the CVJ to allow thickness for sufficient strength. This rib width causes the distance from the CVJ to the wheel flange to be larger than necessary, causing difficulty in optimizing the steering geometry of the vehicle.

BRIEF SUMMARY OF THE INVENTION

In accordance with this invention, generally stated, a wheel bearing assembly is provided which includes a support structure, in the embodiment shown, a knuckle, a universal joint, two tapered roller bearing cups fixedly attached to the knuckle, a wheel hub having a wheel flange suitable for attaching a wheel, and two inner races, in the embodiment shown, the outboard inner raceway being machined into the hub. Two sets of rollers are interposed between respective inner and outer races, contacting their races at an angle to the wheel hub axis and opposing each other. In the embodiment shown, a surface integral with an outer joint member or shell of a CVJ serves as a thrust rib for a back surface of a large end of rollers of the inboard bearing.

DETAILED DESCRIPTION OF THE PREFERRED EMBODIMENT OF THE INVENTION

Figure 1:
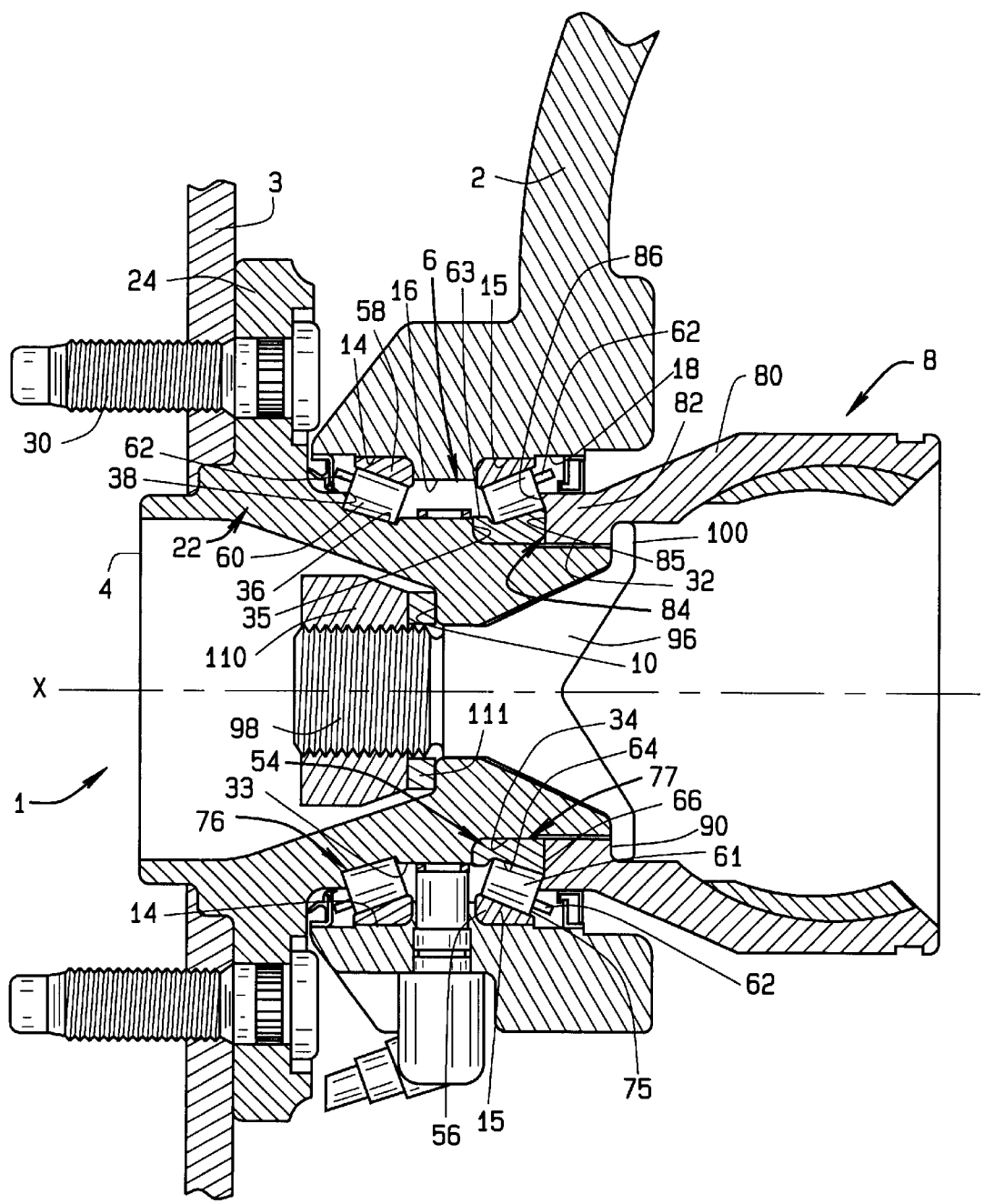
FIG. 1 is a longitudinal sectional view of an assembly constructed in accordance with and embodying one embodiment of the present invention.

Referring now to the drawing, reference numeral 1 indicates a hub assembly of this invention, which couples a road wheel, not here shown, and a brake rotor 3 of an automotive vehicle to the engine system of the vehicle. The suspension system in the illustrative embodiment shown, includes a suspension member 2 that is designed to move generally vertically on the vehicle against the bias of a spring or torsion bar. Where the road wheel is at the front of the vehicle and thus steers the vehicle, the suspension member 2 typically takes the form of a steering knuckle, which is what is illustrated. On the other hand, where the road wheel is at the rear of the vehicle, the member 2 may take the form of a so-called "upright". In addition, the hub assembly 1 includes a hub 4, which rotates in the member 2 on a bearing 6 located between the hub and the member 2. The bearing 6 is made up of an outboard member 76 and an inboard member 77. The bearing 6 enables the hub 4 to rotate about an axis X and is fixed in position with respect to the member 2. The hub assembly 1 includes a constant velocity joint 8, which couples the hub 4 with an axle drive shaft.

As has been indicated, in the embodiment shown, the suspension member 2 is a knuckle. The knuckle 2 serves as a housing for the bearing 6, and to this end contains two bores, an outer bore 14 and inner bore 15. The bores 14 and 15 end at their inner ends at a shoulder 16, and at their outer ends open into counterbores 18 which in turn open out of the knuckle 2.

The hub 4 includes a spindle 22 which extends into the member 2, and a flange 24 which is formed integral with spindle 22 as a single casting or forging and lies outside the knuckle 2. The hub 4 is hollow, with a bell-shaped cavity convergent inboardly, terminating at an annular shoulder 10. The hub flange 24 carries threaded studs 30 which pass through the brake rotor and are engaged by lug nuts for securing a wheel and the brake rotor to the flange.

The spindle 22 has at its inboard end an external spline 32, ending slightly beyond an inboard end of an annular bearing seat 34 of slightly greater diameter. The bearing seat 34 has at its outboard end a shoulder 35, defined by an annular boss 33. Outboard of the boss 33, the spindle 22 has a tapered raceway 36 that lies within the ambit of bore 14 of the member 2. The small end of the raceway 36 is presented toward the bearing seat 34. A thrust rib 38 is located at the large end of the raceway 36. The raceway 36 and thrust rib 38, while integral with the spindle 22 of the hub 4, actually constitute the cone of the outboard member of the bearing 6. An outboard cup 58 of the outboard bearing member is seated in the bore 14, with an inner axially inboard face abutting a face of the shoulder 16.

The bearing 6 includes an inner race in the form of a cone 54, press fitted onto the bearing seat 34. It also includes an outer race in the form of an inboard cup 56, located around the cone 54. Rolling elements in the form of tapered rollers 60 and 61 are positioned between the raceway 36 and the cup 58 of the outboard bearing member 76, and between the raceway 64 and the cup 56 of the inboard bearing member 77, respectively. Each row of tapered rollers 60 and 61 includes a cage 62 for maintaining the proper spacing between the rollers 60 and 61.

The cone 54 has a raceway 64, a large end of which tends outwardly away from the axis X, and a small end rib 63 at its outboard end. Each of the rollers 60 and 61 has a large end face 75 that is configured conventionally. The arris between the tapered surface of the rollers and the end face may be chamfered or rounded. This is conventional.

The cone 54 has at its large end a back surface 66, but no integral thrust rib. The CV joint 8 includes an outer joint member or shell 80 having at an outboard cylindrical end 82, an end face 84 with a section 85 perpendicular to the axis X, and a lip section 86 angled complementarily to the large end faces 75 of the rollers 61. The section 85 of the end face 84 of the shell 80 bears against the back surface 66 of the cone 54, leaving the lip section 86 projecting beyond the back surface 66 of the cone, opposite the large end faces 75 of the rollers 61, to serve as a thrust rib.

In this embodiment, the cylindrical end 82 of the shell 80 has on its inside surface a spline complementary to the spline 32, and an internal annular shoulder 90. It is held in position tightly against the inside face 66 of the cone 54 by a retainer 96. The retainer 96 has an annular flange 100 seated against the shoulder 90 of the shell 80. The retainer 96 has at its outboard end a plug 98, externally threaded to receive a nut 110. A spacer ring 111 is positioned between the nut 110 and the shoulder 10 of the spindle 22 so that when the nut 110 is tightened on the threaded plug 98, the flange 100 is drawn tightly against the shoulder 90 of the shell 80, drawing the end face 84 tight against the back surface 66 of the cone 54. The lip 86 then serves as the thrust rib for the inboard bearing member.

By eliminating the usual thrust rib on the cone of the inboard bearing member, the CVJ is moved closer to the wheel flange, thus more nearly optimizing the steering geometry of the vehicle.

Numerous variations in the construction of the device of this invention, within the scope of the appended claims will occur to those skilled in the art in the light of the foregoing disclosure. Merely by way of example, different arrangements of retaining means for the shell 80 can be provided, as is illustrated in an application of Robert W. Hacker, filed Oct. 17, 2001. Published as Publication no. 20030070886 on Apr. 17, 2003. The supporting member may take the form of an upright. Other forms of universal joint can be used, so long as a shoulder, flange, collar or the like element provides a surface to engage a back face of the inboard cone and a lip to serve as a thrust rib independent of the cone race. The outboard bearing member can be differently constructed, for example, with its cone not integral with the spindle 22. The two cups 56 and 58 may be united into a single double cup or may be formed integral with a housing that is bolted to the suspension member 2. The back surface 66 of the cone 54 can be formed at the angle of the lip 86 and the entire end face 84 of the shell 80, including a portion serving as the lip, formed on the same angle, the lip thus being made in a continuous plane with the remaining surface of the end face. These are merely illustrative.

Having thus described the invention, what is claimed and desired to be secured by Letters Patent is:

1. In an automotive vehicle having a wheel hub with a flange by which a wheel is mounted, said hub being supported by a support member and rotated through a CV joint, the CV joint having a shell with a cylindrical end having an end face, and axially spaced inboard and outboard bearing members between said hub and said support member, said inboard bearing member being a tapered roller bearing with a cone having a raceway and a back face but no thrust rib as a part of said cone, the improvement comprising said shell cylindrical end face abutting said cone back face and adapted to serve as a thrust rib of said bearing member.

2. The improvement of claim 1 wherein the said shell end face has a lip positioned to engaging large end faces of rollers of said inboard roller bearing member.

3. The improvement of claim 2 wherein the cone back face is perpendicular to the axis of rotation of the wheel drive shaft, and a portion of the cylindrical end face of the shell abutting the back face of the cone is perpendicular to said axis of rotation, and the lip extends from said portion beyond the back face of the cone toward said end faces of said rollers.

4. The improvement of claim 1 wherein said support is a steering knuckle.

5. In combination with an automotive vehicle, a hub assembly for coupling a road wheel to a suspension system of said automotive vehicle, said hub assembly comprising a hub with a flange by which said wheel is mounted, said hub being supported by a support member and rotated through a CV joint, the CV joint having a shell with a cylindrical end having an end face, and axially spaced inboard and outboard bearing members between said hub and said support member said inboard bearing member being a tapered roller bearing with a cone having a raceway and a back face, the improvement comprising said inboard cone having no thrust rib and said shell cylindrical end face abutting said cone back face and adapted to serve as a thrust rib of said inboard bearing member.

6. In an automotive vehicle having a wheel hub with a flange by which a wheel is mounted, said hub being supported by a support member and rotated through a universal joint, the universal joint having an element with an end face, and axially spaced inboard and outboard bearing members between said hub and said support member, said inboard bearing member being a tapered roller bearing with a cone having a raceway and a back face but no thrust rib as a part of said cone, the improvement comprising said universal joint element end face being shaped complementarily to and having a portion abutting said cone back face and a lip portion adapted to serve as a thrust rib of said bearing member.

* * * * *